United States Patent [19]
Hartwig

[11] 3,765,525
[45] Oct. 16, 1973

[54] APPARATUS FOR AND METHOD OF ADJUSTING LOCATION OF SHAFT BEARINGS ON GRATE CONVEYOR

[75] Inventor: Walter J. Hartwig, Oconomowoc, Wis.

[73] Assignee: Allis-Chalmers Corporation, Milwaukee, Wis.

[22] Filed: June 6, 1972

[21] Appl. No.: 260,129

[52] U.S. Cl. .......................... 198/208, 74/242.14 R
[51] Int. Cl. ........................ B65g 15/30, F16h 7/10
[58] Field of Search .................................. 198/208; 74/242.14 R; 254/93 R; 92/15, 23; 432/121

[56] References Cited
UNITED STATES PATENTS

| | | | |
|---|---|---|---|
| 2,797,075 | 6/1957 | Wilbur | 198/208 X |
| 3,135,555 | 6/1964 | Caskey | 92/23 X |
| 3,568,569 | 3/1971 | Haley | 74/242.14 R X |

*Primary Examiner*—Edward A. Sroka
*Attorney*—Robert C. Sullivan et al.

[57] ABSTRACT

An apparatus for and a method of adjusting the location of the shaft bearings, particularly the tail shaft bearings, on a grate conveyor or the like, to maintain proper tension on the chains of the conveyor to compensate for change in length of the chains due to temperature change and wear, while also insuring parallelism of the head and tail shafts of the conveyor with respect to each other.

Each shaft bearing whose position is to be adjusted is supported on a slidably adjustable mounting means, and a fluid motor such as a hydraulic ram is mounted with the cylinder thereof in a fixed position on the shaft support structure for a given range of adjustment of the bearing, the ram being pressurized to move the slidable mounting means and the bearing carried thereby to an adjusted position. Precisely dimensioned shims are interposed between the cylinder of the hydraulic ram and the adjustable mounting means to maintain the bearing in a given adjusted position, and after the shims have been so interposed the hydraulic ram is depressurized but the ram cylinder remains in its fixed position to serve as an abutment for the shims.

20 Claims, 7 Drawing Figures

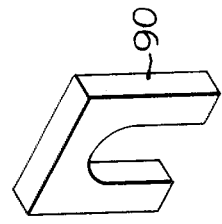
Fig. 3A
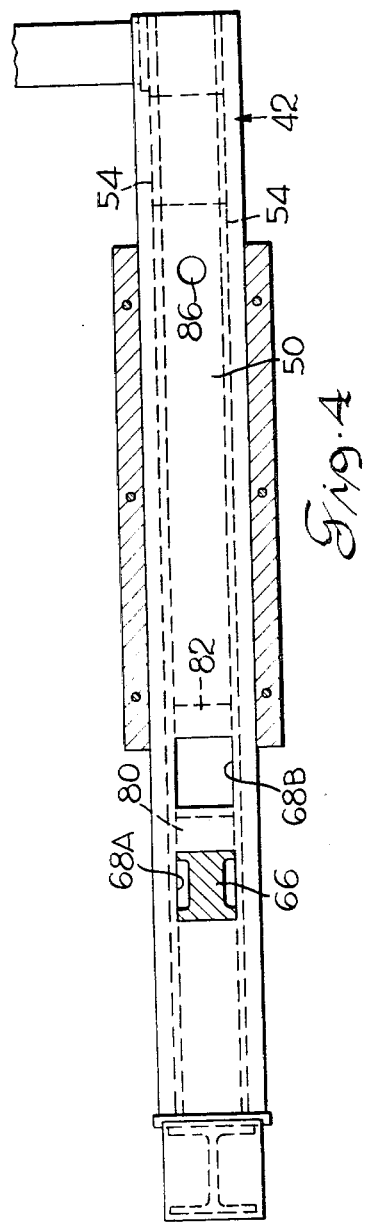
Fig.4
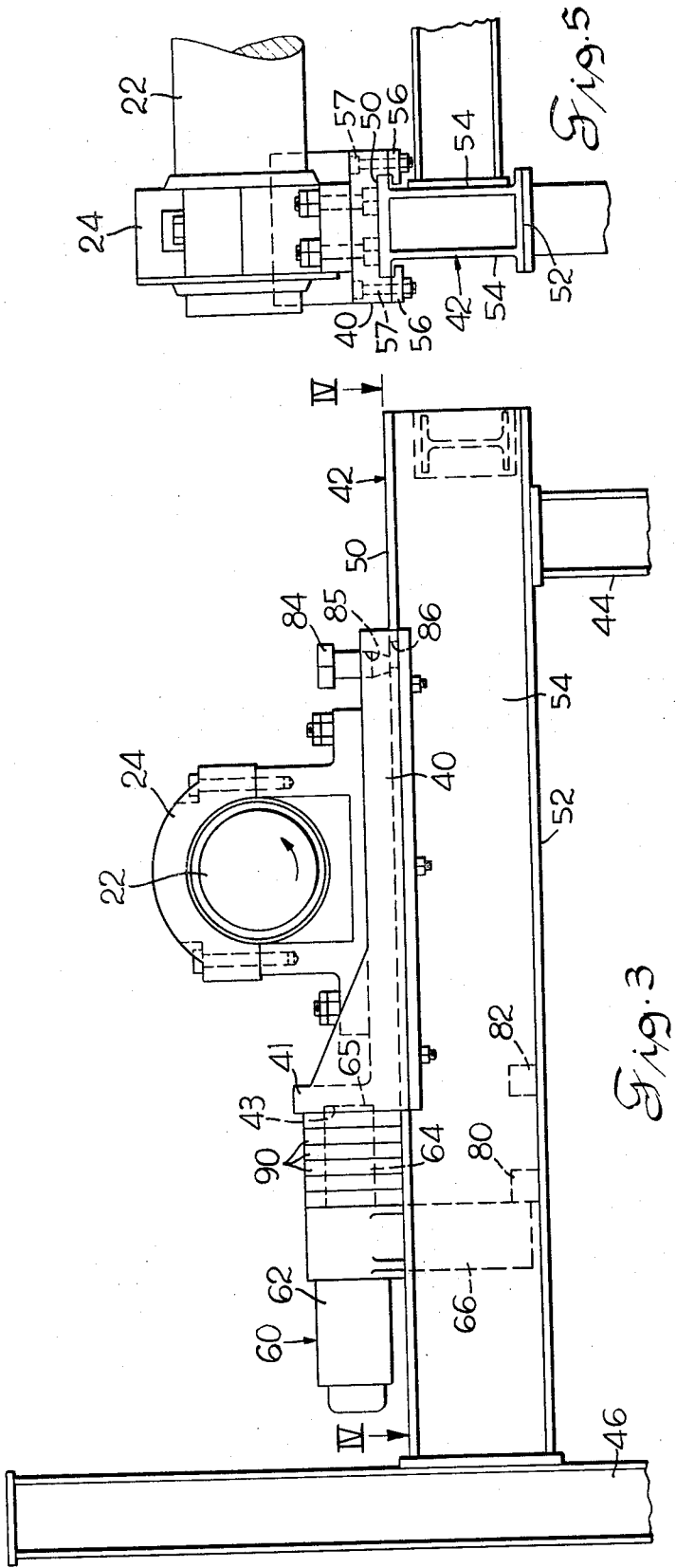
Fig.5
Fig.3

APPARATUS FOR AND METHOD OF ADJUSTING LOCATION OF SHAFT BEARINGS ON GRATE CONVEYOR

BACKGROUND OF THE INVENTION

1. Field of the Invention

This invention relates to traveling grates for use in Grate-Kiln systems or the like such as those used in the heat processing of pelletized mineral ore or the like, and more particularly to apparatus for and a method of adjusting the position of the shaft bearings, such as the tail shaft bearings, for such a traveling grate conveyor in order to maintain proper tension on the drive chains of the grate conveyor, and thus maintain proper tension on the conveyor.

2. Description of the Prior Art

In the prior art practice, traveling grates for use in Grate-Kiln systems or the like have been field aligned to provide upon initial set-up a true rectangular relation of the head shaft and of the tail shaft bearings with respect to each other. The head and tail shafts carry sprockets about which the conveyor drive chains on either lateral side of the conveyor, and, in some cases, intermediate the transverse width of the conveyor, pass. It is important to have a true rectangular relation of the head and tail shafts and of the bearings therefor whereby to insure parallelism of the head shaft and of the tail shaft relative to each other, since any departure from parallelism of these two shafts will cause the conveyor chains and hence the conveyor grates carried thereby to drift or run toward either side of the conveyor, thereby presenting serious operating problems. If the parallel relation of the head and tail shafts and the corresponding rectangular arrangement of the supporting bearings of these two shafts is disturbed, the grate conveyor must be shut down for resurvey and realignment.

Two important factors cause a change in the length of the conveyor chain during the operation of the conveyor as compared to the original length of the chain at the time of start-up of the conveyor, as follows:

1. Increase in chain length due to operating temperature. Assume a conveyor chain having 400 links or pitches, each link having a 10 inch pitch, for a conveyor having a total length of 4,000 inches. If the average chain operating temperature is 500° F., then it can be shown in this assumed hypothetical case that a 12 inch length increase of chain results from the increase in operating temperature from the cold shut-down temperature to the assumed operating temperature of 500° F. (4,000 × 5,000 × 0.000006 = 12 inches), where 0.000006 is the assumed temperature coefficient of expansion of the chain. Such a 12 inch increase in chain length would require a 6 inch adjustment of the head or tail shaft to compensate for chain elongation. In the prior art, this 12 inch of increased chain length due to temperature increase from cold shut-down to operating temperature as set forth in the example just given was tolerated and nothing was done to adjust the location of the shaft bearings to compensate for this temperature-caused increase in chain length. This increase in chain length due to the temperature rise to the operating temperature from a cold shut-down normally occurs in a relatively short time such as after about 24 hours of operation. 2. Increase in chain length due to wear. A second and more important factor in causing an increase in chain length is the wear which occurs at the chain pin and chain link connection which causes a normal pitch increase of about ⅛ inch per pitch per year. Thus, in the preceeding example, if the chain has a total length of about 400 pitches or links, then the length increase per year of the chain due to wear on the average would be ⅛ inch × 400 = 50 inches total increase in chain length per year. This increase would require an adjustment of the head or tail shaft of about 25 inches to maintain the chain tension as it was when it was cold installed. This 25 inch adjustment of the head or tail shaft just mentioned is only to compensate for the wear of the chain and, as previously described, an additional adjustment for temperature-caused chain elongation is also necessary.

There are a number of disadvantages due to the lack of tension and resultant looseness in the chain and in the conveyor produced by the increased chain length as just described. This increased length due to either of the causes previously described (i.e., temperature and wear) is usually accumulated as catenaries between the return rollers of the conveyor, which results in hesitation of the return run of the conveyor and slackening of the conveyor chain in the loading zone, causing minor catenaries of chain undulation on the upper run of the conveyor at the feed end of the conveyor. The chain undulations and consequent similar undulations of the conveyor supported by the chain is comparable to "hills" and "valleys". In the "valleys", the green pellets of the pelletized ore or the like compact, while in going over the "hills" or crests produced by the foregoing described undulations, the pellet bed opens up, resulting in pellet degradation. Wet pellets tend to compact or deform in the "valleys", while the pellet load passing over the crests or hills tend to form craters, cracks, or to open up. This undulation when passing through the drying furnaces forms preferential air flow channels which are detrimental to an ideal process condition. It can be seen that the problem of slack chain produces process conditions which tend to seriously reduce the quality of the product and to produce lack of uniform quality of the product.

In accordance with the practice of the prior art it was the general practice to tolerate and ignore the change in chain length due to temperature increase. With respect to the change in chain length caused by wear it has been the practice in the grate conveyor prior art to shut down the conveyor at the end of a predetermined period such as three months and to remove sufficient chain links from the chain to restore the chain to substantially its original tension. In removing chain links as just described, it was also necessary to remove corresponding grates from the grate conveyor.

In many installations of traveling grates for pelletized ore plants it is desired that the traveling grate run steadily for periods of 6 to 9 months or even for one year without shutdown. It can be seen that the excess chain length produced by the factors previously described make difficult the fulfillment of this objective of steady operation of the conveyor for 6 months to one year, the excess chain frequently forcing a shut-down of the plants for readjustment of the chain after shorter periods of operation such as 3 months.

STATEMENT OF THE INVENTION

Accordingly, it is an object of the present invention to provide an apparatus for and a method of adjusting the position of a shaft of a traveling grate conveyor whereby to maintain proper tension on the traveling grate and the chains thereof.

It is another object of the invention to provide an apparatus for and a method of adjusting the position of the shaft of a traveling grate conveyor which permits adjustment of the tension of the conveyor chains while the traveling grate is in operation.

It is a further object of the invention to provide an apparatus for and a method of adjusting the position of a shaft such as the tail shaft of a grate conveyor which insures the maintenance of true parallelism of the head shaft and of the tail shaft of the traveling grate with respect to each other.

It is a further object of the invention to provide an apparatus for and a method of adjusting the tension of a grate conveyor and the chains thereof to compensate for dimensional changes caused by temperature and by wear on the conveyor chain.

It is a still further object of the invention to provide an apparatus for and a method of adjusting the tension of the chains of a traveling grate conveyor, whereby to insure a uniform high quality processing of the ore pellet load or the like carried by the grate conveyor.

It is still a further object of the invention to provide an apparatus for and a method of adjusting the tension of the chains of a traveling grate conveyor which provides increased operating time of the conveyor, due to reduced maintenance time required, and which also provides reduced maintenance cost, and increased chain life.

In achievement of these objectives, there is provided in accordance with an embodiment of the invention as apparatus for and a method of adjusting the location of the shaft bearings, particularly the tail shaft bearings, on a grate conveyor or the like, to maintain proper tension on the chains of the conveyor to compensate for change in length of the chains due to temperature change and wear, while also insuring parallelism of the head and tail shafts of the conveyor with respect to each other.

Each shaft bearing whose position is to be adjusted is supported on a slidably adjustable mounting means, and a fluid motor such as a hydraulic ram is mounted with the cylinder thereof in a fixed position on the shaft support structure for a given range of adjustment of the bearing, the ram being pressurized to move the slidable mounting means and the bearing carried thereby to an adjusted position. Precisely dimensioned shims are interposed between the cylinder of the hydraulic ram and the adjustable mounting means to maintain the bearing in a given adjusted position, and after the shims have been so interposed the hydraulic ram is depressurized but the ram cylinder remains in its fixed position to serve as an abutment for the shims.

Further objects and advantages of the invention become apparent with the following description taken in conjunction with the accompanying drawings in which:

BRIEF DESCRIPTION OF THE DRAWINGS

FIG. 1 is a schematic view of a grate conveyor carrying a load of ore pellets or the like through a plurality of heated zones prior to delivering the pellets to a rotary kiln or the like;

FIG. 3 is a view in side elevation showing the tail shaft bearing at one side of the grate conveyor, together with the adjusting mechanism therefor;

FIG. 3A is a perspective view of one of the shims of FIG. 3;

FIG. 4 is a view along line IV—IV of FIG. 3 of the beam or other structural member on which the tail shaft bearing and the adjusting device of FIG. 3 are supported;

FIG. 5 is an end view of FIG. 3 showing the slidable carriage which supports one end of the tail shaft for adjustable movement.

DESCRIPTION OF THE PREFERRED EMBODIMENT

Figure 1:
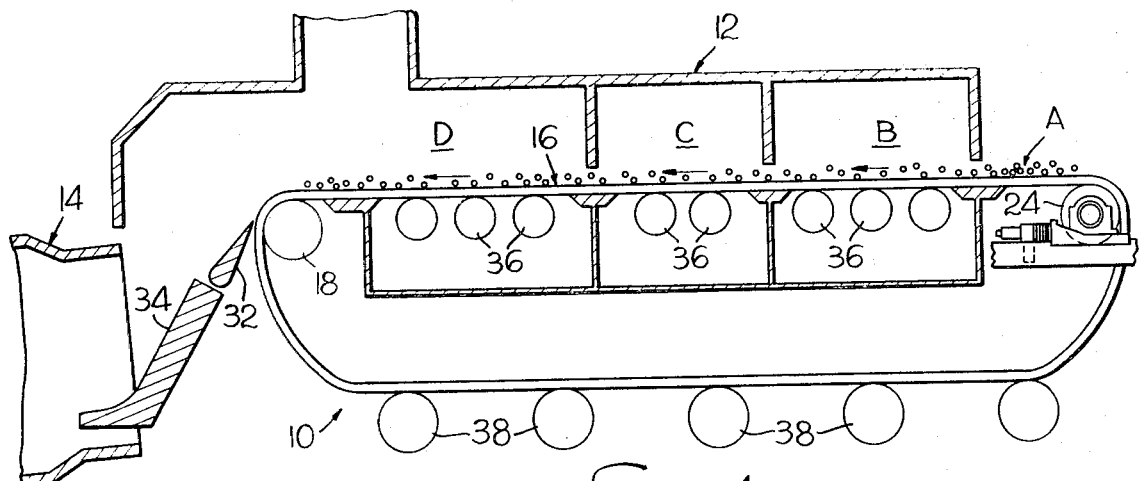

Referring now to the view of FIG. 1, there is shown a diagrammatical view of a Grate-Kiln system generally indicated at 10 including a grate enclosure generally indicated at 12 and a rotary kiln generally indicated at 14. Systems of this general type are shown, for example, in U.S. Pat. Nos. 2,925,336—Stowasser, 3,110,483—Baxa, 3,110,751—Bade, and 3,396,952—Jennrich et al. A grate conveyor generally indicated at 16 passes around the head shaft 18 which is supported for rotation by suitable oppositely disposed bearing 20, 20', and around a tail shaft 22 which is supported for rotation by suitable oppositely disposed bearings 24, 24'. The term "bearing" as used in this application is intended to include the actual bearing element and also the housing for the bearing element. Oppositely disposed conveyor chains 26 are trained around sprockets 28 fixed on the head shaft 18, and around sprockets 30 fixed on the tail shaft 22. The head shaft 18 in the illustrated embodiment is rotatably driven by a suitable drive means 19, whereby to cause rotation of the conveyor 16. In the present embodiment, the tail shaft 22 rotates in bearings 24, 24'. However, tail shaft 22 could be nonrotatable in its bearings, with sprockets 30 being rotatable relative to the nonrotatable tail shaft 22. Suitable grates, not shown, are connected between and movably carried by the oppositely disposed chains 26 in a manner well known in the art.

The conveyor 16 receives a load of "green" (i.e., untreated) mineral ore pellets at the loading zone indicated at A at the right-hand side of FIG. 1. The conveyor 16 moves from right to left with respect to the view of FIG. 1, and carries the pellets successively through a first drying section indicated B, through a second drying section indicated at C, and through a preheat section indicated at D. The pellets in the various sections B, C and D are heated by exhaust gases from rotary kiln 14 in a manner well known in the art. When the pellets reach the end of the upper run of the conveyor 16 at the left of the view of FIG. 1, they are removed from the conveyor by a scraper 32 which delivers the pellets by means of a chute or the like 34 to the inlet end of rotary kiln 14. The upper run of each conveyor chain 26 is supported by parallel roller members 36, and the lower run of each conveyor chain is supported by return rollers 38. Conveyor 16 including the chains 26 thereof, is heated to an elevated temperature such as, for example, 500°Fahrenheit during its passage through the grate enclosure 12.

Referring now to FIG. 3, there is shown the arrangement for tensioning conveyor chain 26, and hence the conveyor 16 supported by the conveyor chain, at one side of the conveyor structure, it being understood that the adjustment arrangement on the other side is exactly the same. Bearing 24 for tail shaft 22 is mounted on a base or mounting means 40 which is slidably adjustably movable upon a beam 42 which, in turn, is suitably supported with respect to the ground or other foundation by suitable vertical frame members 44 and 46.

Since head shaft 18 is connected to the drive means 19, it is simpler and preferable to adjust the chain tension by adjusting the position of the bearings 24, 24' of tail shaft 22.

The slidably adjustable base 40 upon which bearing 24 is mounted is provided with a vertical abutment 41 which is engaged by shims 90, as will be explained more fully hereinafter. Abutment 41 is also provided in the face thereof directed toward hydraulic ram 60 (to be described) with a shallow countersunk recess 43 which serves as a seat for the end of piston 64 of the hydraulic ram 60.

As best seen in FIGS. 3, 4 and 5, beam member 42 on which bearing 24 is mounted for sliding adjustment is in the form of a box beam including a top plate or wall member 50, a bottom plate or wall member 52, and oppositely disposed laterally spaced side walls 54. It will be noted in FIG. 5 that the top plate 50 projects laterally on either side of the oppositely disposed side walls 54, and that the slidably movable base 40 for bearing 24 is provided with detachable keeper members 56 held in place by bolts 57, which are adapted to underlie the under surface of the laterally projecting portions of top wall 50 of box beam 42, to prevent upward displacement of upward angular movement of the bearing 24. However, sufficient clearance is provided between keepers 56 and the under surface of wall 50 to permit linear movement of base 40 along beam 42. As will be explained more fully hereinafter, adjustably movable bearing 24 is held in a given adjusted position by the cooperation of a hydraulic ram and shims.

Figure 6:
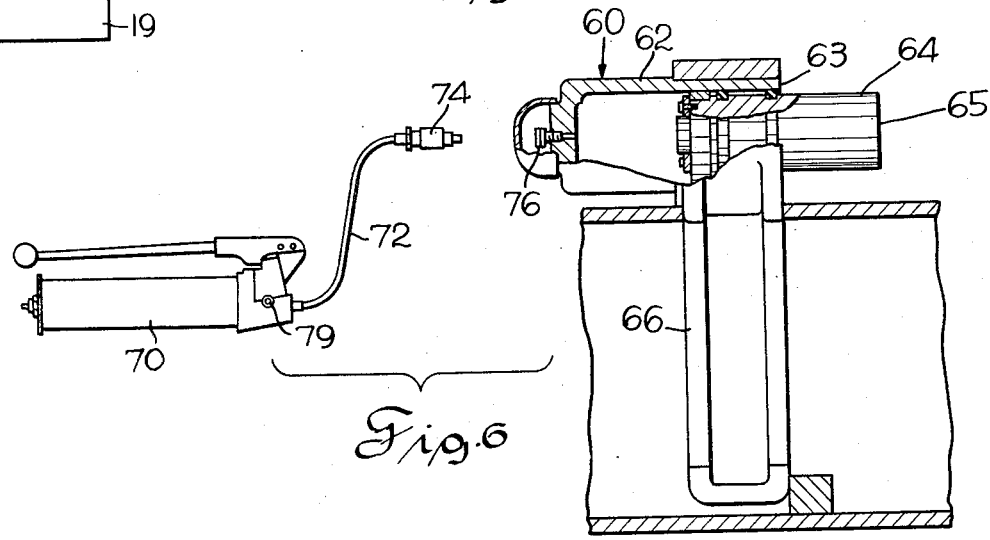
FIG. 6 is a side elevation view on a larger scale of the hydraulic adjusting device of FIG. 3, together with the hydraulic pump used in association with the hydraulic adjusting device.

In accordance with a feature of the construction, a fluid motor in the form of a hydraulic ram generally indicated at 60 is provided as a permanent part of the tail shaft position adjusting assembly. The hydraulic ram 60 comprises a cylinder 62 and a hydraulically movable piston member 64 which may move from a position in which it is substantially completely retracted within cylinder 62 to a position in which it is advanced a predetermnied distance such as 12-½ inches, for example, beyond the end of cylinder 62. Cylinder 62 is provided with an elongated lug member 66 which is rigidly secured to cylinder 62 and which projects laterally downwardly from cylinder 62, as best seen in the views of FIGS. 3 and 6. In order to receive lug member 66 of hydraulic ram 60, the upper plate or wall 50 of the box beam 42 is provided with several longitudinally spaced holes 68A and 68B of square or rectangular cross-section as best seen in FIG. 4 through which lug member 66 may extend down into the interior of hollow box beam 42. In a typical installation, the aperture or hole 68A or 68B is made, for example, of a cross-sectional size of 7-½ by 6-½ inches and the cross-section of the lug 66 which is received in aperture 68A or 68B is just sufficiently less than the size of the aperture 68A or 68B to permit easy insertion or removal of the lug relative to the aperture 68A or 68B as the case may be.

A pair of "lug stop blocks" 80 and 82 are positioned within the hollow interior of beam 42 in spaced relation to each other longitudinally of beam 42. The lug stop blocks 80 and 82 are rigidly secured, as by welding, to the inside surface of bottom wall 52 of beam 42. Lug stop block 82 is located in the example shown a distance such as 12-½ inches to the right of lug stop block 80, as seen in the view of FIG. 3. The function of lug stop blocks 80 and 82 is to absorb the force or thrust on the lower end of lug 66 which might tend to cause counterclockwise angular movement of ram 60 and the connected lug 66, relative to the view shown in FIG. 3. Lug stop block 80 is accurately positioned so as to engage the right-hand edge with respect to the view of FIG. 3 of lug 66 when hydraulic ram 60 is in the "Station 1" position shown in FIG. 3 in which lug 66 passes through hole 68A; while lug stop block 82 is correspondingly located to engage the right-hand edge of lug 66 when the hydraulic ram 60 has been moved to "Station 2" in which lug 66 engages the facing edge of lug stop block 82.

DESCRIPTION OF OPERATION

Adjustment for Chain Length Increase After Starting from Cold Start

Assume that grate conveyor 16 is being started up after having been shut down so that the temperature of the grate conveyor at starting is substantially 500°) Fahrenheit lower than it will be after it reaches average operating temperature. For a cold start, hydraulic ram 60 is mounted on support beam 42 at the "Station 1" position shown in FIG. 3 in which lug 66 carried by hydraulic ram 60 is received in aperture 68A of top wall 50 of beam 42, and in which the lower end of lug 66 abuts against the left-hand face of stop block 80. At the time of the cold start-up, piston 64 of hydraulic ram 60 is in its completely retracted position within cylinder 62, and slide carriage 40 on which bearing 24 of tail shaft 22 is mounted is at the extreme left position with respect to the view shown in FIG. 3 in which vertical abutment 41 of carriage 40 is engaged with end edge 63 of the cylinder 62 of hydraulic ram 60. In the retracted positon of piston 64, the outer face 65 of piston 64 is substantially flush with the end edge 63 of cylinder 62.

Figure 2:
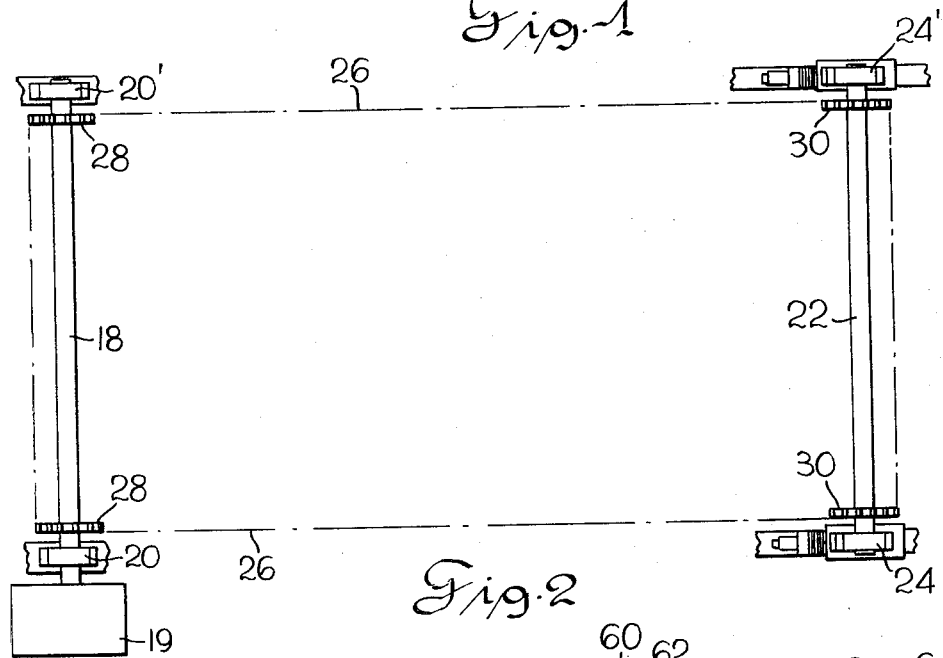
FIG. 2 is a diagrammatic plan view of the grate conveyor of FIG. 1 illustrating the rectangular outline defined by the bearings of the head shaft and of the tail shaft with respect to each other, with consequent parallelism of the head and tail shafts with respect to each other.

As conveyor chain 26 comes up to normal operating temperature which may represent, for example, a rise of approximately 500° F. from its cold start-up temperature, an elongation of the chain will occur, such as a 12-inch length increase for a chain of 400 pitches having a total cold length of 4,000 inches, in accordance with the example previously given. A total increase in length of 12 inches due to the temperature rise as just explained is distributed, of course, on both the upper and lower runs of the conveyor chain, and hence a movement to the right of 6 inches with respect to the view of FIG. 3 of the tail shaft bearing 24 will restore the chain to substantially the original tension which it had when cold. In order to move tail shaft bearing 24 the 6 inch distance as just described, a hydraulic pump 70 is connected by conduit 72 and coupler 74 to inlet 76 of the hydraulic ram 60 and pump 70 is actuated to pump hydraulic fluid into cylinder 62 to cause piston 64 to advance and move slidably movable carriage or mounting means 40 the necessary distance, such as 6 inches, for example, required to retension chain 26 to its original cold tension, plus an additional distance, such as ½ inch, for example, to provide sufficient clearance for the insertion of shims 90 to be described. It will be understood that the same operation is performed on each of the opposite bearings 24 and 24' of FIG. 2, and that each bearing 24, 24' is moved by a corresponding hydraulic ram.

Pump 70 is provided internally thereof with its own self-contained reservoir for hydraulic fluid having a capacity sufficient to advance piston 64 of the pump through the maximum desired stroke, such as 12-½ inches, for example.

When the piston 64 of the hydraulic ram has been advanced the desired distance for the particular adjustment being made, say six and one-half inches, for example, a plurality of the U-shaped shims 90 shown in FIG. 3A are inserted in the space between the forward end 63 of the cylinder 62 of hydraulic ram 60 and the facing surface of vertical abutment 41 on slidable carriage 40. Each of the shims 90 is precisely dimensioned to have a predetermined thickness. For example, each shim 90 may have a thickness of precisely 2 inches in a direction extending lengthwise of beam 42, so that if the hydraulic ram has advanced the slidable carriage 40 a distance of 6 and ½ inches, for example, three of the shims 90 will be positioned between end 63 of cylinder 62 and the facing surface of abutment 41 in the manner shown in FIG. 3. The U-shape of shims 90 permits the shims to straddle piston rod 64 of hydraulic ram 60.

After shims 90 are in position as shown in FIG. 3, with the number of shims multiplied by the thickness of each shim corresponding to the necessary amount of shifting of tail shaft 22 to retension chain 26 to its original tension, valve 79 on pump 70 is then actuated to permit reverse flow of hydraulic fluid from cylinder 62 back to pump 70, permitting slidable carriage 40 under the influence of the forces on the chains such as the weight and tension on the chains, to move to the left relative to FIG. 3, to retract piston 64 to a position in which it exerts zero pressure on carriage 40 and in which the precisely dimensioned shims 90 will be tightly compressed between abutment 41 and the end 63 of cylinder 62. The weight of the chains and connected grates alone would normally be sufficient to move carriage 40 as just described. In this condition in which shims 90 are in the tightly compressed relation just described, the extra one-half inch clearance distance to which carriage 41 has been advanced will have been removed, and the shaft 22 will have been advanced exactly 6 inches (in the assumed example) beyond its original cold start-up position. Since the same operation as that just described is performed on each of the oppositely disposed tail shaft bearings 24, 24', it can be seen that the rectangular relation of the head and tail shaft bearings (FIG. 2) and the parallel relation of shafts 20, 22 is maintained.

With the hydraulic circuit between hydraulic ram 60 and pump 70 connected for reverse flow as just described, pump 70 may be disconnected from hydraulic cylinder 62 when it is noted that the shims 90 are tight, which is indicative that zero pressure is being exerted by piston 64 on abutment 41 of carriage 40.

After the shims have been positioned as just described to make the adjustment for temperature elongation of chain, hydraulic ram 60 remains in position on the structure as shown in the view of FIG. 3 and the end of the cylinder 62 serves as an abutment for the shims during the continuous operation of the grate conveyor. The retainer pin 84 is used to secure the slidable carriage 40 to the box beam 42 only during the transition period when hydraulic ram 60 is being moved from one adjustment station to anotehr adjustment station, as from adjustment station No. 1 to adjustment station No. 2, as will be described.

ADJUSTMENT TO RETENSION CHAIN TO COMPENSATE FOR WEAR ON CHAIN

Assume that at the end of a predetermined period of operation, say three months, for example, it is visually observed that chain 26 has become loose due to wear on the chain as previously explained. The chain has already been retensioned for the change in length due to the temperature rise to operating temperature as previously explained and at the end of the three month period just assumed, the depressurized hydraulic ram 60 is in position on beam 42 and serves as an abutment as previously explained with three shims in position between cylinder 62 of the hydraulic ram and the abutment 41 on bearing slide carriage 40. In order to now further tension the chain to compensate for wear at the end of the assumed 3 month period of operation, pump 70 is again connected to hydraulic cylinder 62 and hydraulic fluid is pumped by the pump into the hydraulic cylinder to cause piston 64 to advance bearing 24 the necessary distance to retension chain 26 to the desired optimum tension which, it is assumed, for sake of example, to be another 6 inches, plus an additional distance such as one-half inch to provide clearance for the insertion of the additional shims required. When bearing 24 has been advanced the additional 6 inches plus clearance distance for a total advance of 12 inches plus clearance distance (including the prior advance of 6 inches for temperature compensation), three additional shims are added to the three already in place for a total of 6 shims between the end of the hydraulic 62 and the facing surface of the abutment 41 on carriage 40. Thus, shaft 22 will have been advanced a total of 12 inches (plus clearance for shim insertion) 6 inches of which were for temperature compensation and 6 inches of which were for wear compensation. With the 6 2-inch thick shims in position, hydraulic pressure is again removed from piston 64 by opening pump valve 79 which permits reverse flow of hydraulic fluid from cylinder 62 back to pump 70. The forces on chain 26 cause movement of slidable carriage 40 to take up the clearance provided for shim insertion, and the shims pack becomes tightly compressed, all as previously explained. Pump 70 is then disconnected. Hydraulic ram 60 remains in the position shown in FIG. 3 in which end wall 63 of cylinder 62 serves as an abutment which cooperates with shims 90 to hold slidable carriage 40 in the new position to which it has been adjusted.

Now assume that at the end of 6 months of operation the wear on chain 26 has again caused sufficient looseness that it is desirable to again retension the chain. The hydraulic ram in the Station 1 position shown in FIG. 3 has been moved to its extreme limit of adjustment, since it is assumed that piston 64 has only a range of movement of 12 inches plus an additional amount such as one-half inch required to provide clearance for shim insertion. It is now necessary if any further adjustment is to be made, to reposition the hydraulic ram at another adjusting station along beam 42.

To facilitate removal of the hydraulic ram 60 from adjustment Station 1 preparatory to positioning it at adjustment Station 2, pump 70 is reconnected to the hydraulic ram and sufficient hydraulic fluid is admitted to advance the bearing carriage 40 through a clearance distance sufficient to loosen the shim pack. Retainer pin 84 is dropped through aligned apertures 85 and 86 in slidable carriage 40 and in the upper plate 50 of box beam 42 to temporarily hold slidable carriage 40 and the bearing 24 carried thereby in the newly adjusted position just mentioned at which the shims 90 are sufficiently loose to permit easy removal thereof. To remove the hydraulic piston 60 and the shims from the station 1 position shown in FIG. 3, the hydraulic ram is then depressurized by opening valve 79 and the depressurized piston 64 may be manually retracted. Pump 70 is then disconnected from the hydraulic ram. Hydraulic ram 60 is then removed from its engagement with aperture 68A (Station 1) and is repositioned into the next adjustment station (Station 2) in which lug 66 engages hole or aperture 68B in plate 50 of box beam 42, with the right-hand edge of lug 66 engaging the left-hand edge, with respect to the view of FIG. 3, of lug stop block 82, and with the surface 63 of cylinder 62 engaging abutment 41 on carriage 40. With hydraulic ram 60 in position at Station 2 as just described, retainer pin 84 is removed from engagement with the aperture 86 in upper plate 50 of box beam 42.

With hydraulic ram 60 at the second adjustment station as just described in which lug 66 engages aperture 68B of box beam 42, another additional twelve inches of adjustment is available in addition to the adjustment which has already been made at adjustment Station No. 1. The adjustment of the position of bearing 24 at adjustment Station No. 2 is made in the same manner as described in connection with Station No. 1.

It will be understood that the tail shaft adjusting apparatus and structure described is duplicated on each of opposite sides of the conveyor for each of the respective adjustably movable tail shaft bearings 24 and 24', and that when any adjustment is made for one tail shaft bearing, a corresponding adjustment is made for the opposite tail shaft bearing.

It might be noted that in a typical installation of the type described hereinbefore and shown in the drawings, each tail shaft bearing 24, 24' may be subjected to a resultant force of the order of magnitude of 200,000 pounds per bearing, this force being a resultant of the various forces to which the bearing is subjected.

While only two adjustment stations have been shown in the illustrated embodiment, obviously additional adjustment stations could be provided if it is contemplated that the particular grate conveyor installation will require adjusting movement of tail shaft 22 beyond that provided by the two adjustment stations shown in the illustrated embodiment.

When it is desired to shut down the conveyor which has been tensioned in the manner previously described, in order to avoid unduly stressing the chains whose temperature is dropping with resultant contraction in chain length, a procedure which is substantially the reverse of that described is followed to compensate for the decreasing length of the chains. Shims are removed as necessary, and the hydraulic ram may be transferred from one adjustment station to another, if necessary to compensate for the decreased chain length during the cooling-off period of the grate conveyor.

All of the various adjustments mentioned hereinbefore may be made while the conveyor is in operation. Although the conveyor and conveyor chain are operating at a high temperature, the ambient temperature at the location where the adjustments are being made is much lower than that of the conveyor and conveyor chains, and is sufficiently low to permit access by workmen making the adjustments.

By using a plurality of adjustment stations as shown and described in the present application, a smaller and shorter ram may be used in a given installation than if the ram were to be left at a single adjustment station, since use of a single adjustment station would require a longer ram having a piston with a longer stroke with resultant greater stresses, than in the embodiment described in the present application.

From the foregoing detailed description of the present invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. In a conveyor system including a head shaft and a tail shaft, a conveyor chain trained around said head shaft and said tail shaft, a first pair of laterally spaced bearings supporting said head shaft, a second pair of laterally spaced bearings supporting said tail shaft, the improvement which comprises supporting each bearing of one of said pairs on a separate slidable mounting means whereby to permit adjustment of the location of the shaft supported by said one of said pairs of bearings to permit tensioning of said chain, a fluid motor corresponding to each slidable mounting means, each of said fluid motors including a cylinder and a piston linearly movable in said cylinder, means for anchoring the cylinder of each fluid motor in a fixed position relative to a stationary support comprising a lug member affixed to the respective cylinder, said lug member being adapted to detachably engage an aperture in a corresponding stationary support member, each respective piston being engageable with a corresponding one of said slidable mounting means, whereby to slidably adjust the position of said corresponding mounting means, and precisely dimensioned shim means extending throughout the space between the corresponding mounting means and the cylinder of the corresponding fluid motor, whereby to hold each respective mounting means in a given adjusted position.

2. A conveyor system as defined in claim 1 in which the bearings of said one of said pairs support said tail shaft.

3. A conveyor system as defined in claim 1 in which said shim means between each respective mounting means and the corresponding cylinder is adapted to straddle the corresponding piston.

4. A conveyor system as defined in claim 1 in which each respective stationary support member comprises a box beam contiguous a lateral side of said conveyor for supporting a corresponding bearing of said one of said pairs, the slidable mounting means for supporting each respective bearing being mounted for slidable movement along the upper wall of the corresponding box beam, said upper wall being provided with an aperture to receive said lug member whereby said lug member extends into the interior of said box beam, and a stop block mounted on the interior of said box beam and engageable with said lug member to absorb forces on said lug member.

5. In a grate conveyor system including a head shaft and a tail shaft, a conveyor chain trained around said head shaft and said tail shaft, a plurality of grate members connected to and movable with said chain, a bearing supporting said head shaft, a bearing supporting said tail shaft, the improvement which comprises mounting one of said bearings on a slidably movable mounting means whereby to permit adjustment of the location of the corresponding shaft to permit tensioning of said chain, a fluid operated motor associated with said mounting means, said motor including a cylinder and a piston linearly movable in said cylinder, means for anchoring the cylinder of said fluid motor in a fixed position relative to a stationary support, comprising a lug member affixed to said cylinder, said lug member being adapted to engage an aperture in said stationary support, said piston being engageable with said mounting means whereby to slidably adjust the position of said mounting means, and precisely dimensioned shim means extending throughout the space between said mounting means and said cylinder, whereby to hold said mounting means in a given adjusted position.

6. A grate conveyor system as defined in claim 5 in which said stationary support comprises a box beam contiguous a lateral side of said conveyor for supporting said one bearing, the slidable mounting means for said one bearing being mounted for slidable movement along the upper wall of said box beam, said upper wall being provided with an aperture to receive said lug member whereby said lug member extends into the interior of said box beam, and a stop block mounted on the interior of said box beam and engageable with said lug member to absorb forces on said lug member.

7. In a grate conveyor system including a head shaft and a tail shaft, a conveyor chain trained around said head shaft and said tail shaft, a plurality of grate members connected to and movable with said chain, a bearing supporting said head shaft, a bearing supporting said tail shaft, the improvement which comprises mounting one of said bearings on a slidably movable mounting means whereby to permit adjustment of the location of the corresponding shaft to permit tensioning of said chain, a fluid operated motor associated with said mounting means, said motor including a cylinder and a piston linearly movable in said cylinder, said piston being engageable with said mounting means whereby to slidably adjust the position of said mounting means, precisely dimensioned shim means extending throughout the space between said mounting means and said cylinder, whereby to hold said mounting means in a given adjusted position, and cooperating means carried by said cylinder and by a stationary support for selectively detachably anchoring the cylinder of said fluid motor at any one of a plurality of fixed positions along said stationary support whereby to provide a plurality of adjustment stations for adjustment of the location of said corresponding shaft.

8. A grate conveyor system as defined in claim 7 in which said one bearing supports said tail shaft.

9. A grate conveyor system as defined in claim 7 in which said shim means is adapted to straddle said piston.

10. In a grate conveyor system including a head shaft and a tail shaft, a conveyor chain trained around said head shaft and said tail shaft, a plurality of grate members connected to and movable with said chain, a bearing supporting said head shaft, a bearing supporting said tail shaft, the improvement which comprises mounting one of said bearings on a slidably movable mounting means whereby to permit adjustment of the location of the corresponding shaft to permit tensioning adjustment of said chain, motor means associated with said mounting means, said motor means including a housing and a linearly movable ram element, means for anchoring said housing at a fixed position relative to a stationary support, comprising a lug member affixed to said housing, said lug member being adapted to detachably engage an aperture in said stationary support, said ram element being engageable with said mounting means whereby to slidably adjust the position of said mounting means, and precisely dimensioned shim means extending throughout the space between said mounting means and said housing, whereby to hold said mounting means in an adjusted position to which it has been moved.

11. A grate conveyor system as defined in claim 10 in which said stationary support comprises a box beam contiguous a lateral side of said conveyor for supporting said one bearing, the slidable mounting means for said one bearing being mounted for slidable movement along the upper wall of said box beam, said upper wall being provided with an aperture to receive said lug member whereby said lug member extends into the interior of said box beam, and a stop block mounted on the interior of said box beam and engageable with said lug member to absorb forces on said lug member.

12. A grate conveyor system as defined in claim 10 in which said shim means is adapted to straddle said ram element.

13. A grate conveyor system as defined in claim 10 in which said one bearing supports said tail shaft.

14. In a grate conveyor system including a head shaft and a tail shaft, a conveyor chain trained around said head shaft and said tail shaft, a plurality of grate members connected to and movable with said chain, a bearing supporting said head shaft, a bearing supporting said tail shaft, the improvement which comprises mounting one of said bearings on a slidable movable mounting means whereby to permit adjustment of the location of the corresponding shaft to permit tensioning adjustment of said chain, motor means associated with said mounting means, said motor means including a housing and a linearly movable ram element, said ram element being engageable with said mounting means whereby to slidably adjust the position of said mounting means, precisely dimensioned shim means extending throughout the space between said mounting means and said housing, whereby to hold said mounting means in an adjusted position to which it has been moved, and cooperating means carried by said housing and by a stationary support for selectively detachably anchoring the housing of said motor means at any one of a plurality of fixed positions along said stationary support whereby to provide a plurality of adjustment stations for adjustment of the location of said corresponding shaft.

15. In a conveyor system including a head shaft and a tail shaft, a conveyor trained around said head shaft and said tail shaft, a bearing supporting said head shaft, a bearing supporting said tail shaft, the improvement which comprises mounting one of said bearings on a slidably movable mounting means whereby to permit adjustment of the location of the corresponding shaft to permit tensioning adjustment of said conveyor, motor means associated with said mounting means, said motor means including a housing and a linearly movable ram element, means for anchoring said housing at a fixed position relative to a stationary support, comprising a lug member affixed to said housing, said lug member being adapted to detachably engage an aperture in said stationary support, said ram element being engageable with said mounting means whereby to slidably adjust the position of said mounting means, the space between said mounting means and said housing being adapted to receive precisely dimensioned shim means whereby to hold said mounting means in an adjusted position to which it has been moved.

16. A conveyor system as defined in claim 15 in which said stationary support comprises a box beam contiguous a lateral side of said conveyor for supporting said one bearing, the slidable mounting means for said one bearing being mounted for slidable movement along the upper wall of said box beam, said upper wall being provided with an aperture to receive said lug member whereby said lug member extends into the interior of said box beam, and a stop block mounted on the interior of said box beam and engageable with said lug member to absorb forces on said lug member.

17. In a conveyor system as defined in claim 15, precisely dimensioned shim means interposed in the space between said mounting means and said housing.

18. In a conveyor system including a head shaft and a tail shaft, a conveyor trained around said head shaft and said tail shaft, a bearing supporting said head shaft, a bearing supporting said tail shaft, the improvement which comprises mounting one of said bearings on a slidably movable mounting means whereby to permit adjustment of the location of the corresponding shaft to permit tensioning adjustment of said conveyor, motor means associated with said mounting means, said motor means including a housing and a linearly movable ram element, said ram element being engageable with said mounting means whereby to slidably adjust the position of said mounting means, the space between said mounting means and said housing being adapted to receive precisely dimensioned shim means whereby to hold said mounting means in an adjusted position to which it has been moved, and cooperating means carried by said housing and by a stationary support for selectively detachably anchoring the housing of said motor means at any one of a plurality of fixed positions along said stationary support whereby to provide a plurality of adjustment stations for adjustment of the location of said corresponding shaft.

19. In a conveyor system as defined in claim 18, precisely dimensioned shim means interposed in the space between said mounting means and said housing.

20. In a conveyor system as defined in claim 18, said linearly movable ram element including a free end facing said mounting means, said free end being engageable with said mounting means but not connected to said mounting means.

* * * * *